Oct. 23, 1962  J. D. MILLER  3,059,574
STRIPE PAINTING MACHINE
Filed Feb. 14, 1961

INVENTOR.
JERRY D. MILLER

United States Patent Office 3,059,574
Patented Oct. 23, 1962

3,059,574
STRIPE PAINTING MACHINE
Jerry D. Miller, Box 2, Beall Hall, McConnell AFB, Kans.
Filed Feb. 14, 1961, Ser. No. 89,263
2 Claims. (Cl. 101—328)

This invention relates generally to painting equipment, and more specifically to an automatic road centre strip painting machine.

The presently known road strip painting machines consist of a small trailer whcih is normally towed behind a truck. The trailers carry highly complex equipment which must be constantly supervised to ensure proper operation. Modern units are designed to spray the paint selectively in a series of dashes, or in a continuous line. The maintenance cost of this equipment is considerable and the speed of application leaves much to be desired.

It is therefore a primary object of this invention to provide an automatic road line painting machine which is constructed from a minimum of working parts for efficiently painting the centre lines of roads and highways at a high rate of speed.

It is a further object of this invention to provide an automatic road line painting machine which automatically maintains the paint in a thoroughly mixed condition without need for mechanical stirring.

It is a still further object of this invention to provide an automatic road line painting machine of the above class which may be effectively operated and controlled from the driving compartment.

It is yet a further object of this invention to provide an automatic road line painting machine which operates efficiently on considerably reduced volumes of paint per mile of run in comparison with conventional machines.

The above objects have been achieved by the provision of a large wheel structure having axially spaced peripheral tires. The wheel is supported for rotation rearwardly of the vehicle and is adapted for selective rotative engagement with the ground. The wheel tires are supported by radially mounted spokes which provide support for paint supply tanks distributed symmetrically around the wheel radially spaced from the centre thereof. Paint supply pipes extend from the tanks and terminate with painting heads disposed symmetrically about the periphery of the wheel and spaced between the peripheral tires. The heads contain removable paint absorbent pads adapted to dispense a fixed quantity of paint upon making contact with the road.

Further objects and advantages of this invention will become apparent from the following more detailed description of a preferred embodiment thereof, taken in conjunction with the attached drawings wherein.

Similar reference characters indicate corresponding parts throughout the several views in the drawing.

Figure 1:
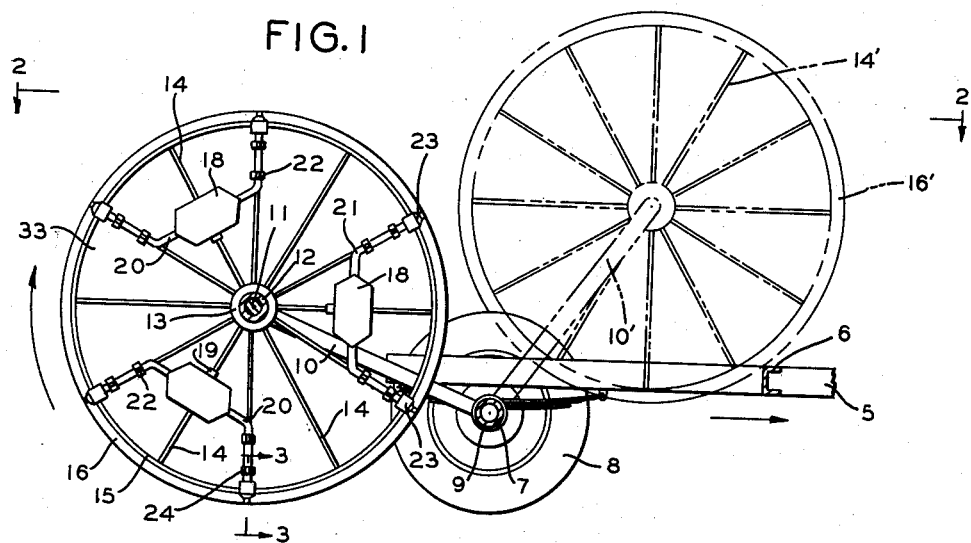
FIG. 1 is a side elevation of the painting machine shown mounted on the rear axle of a trailer.
Figure 2:
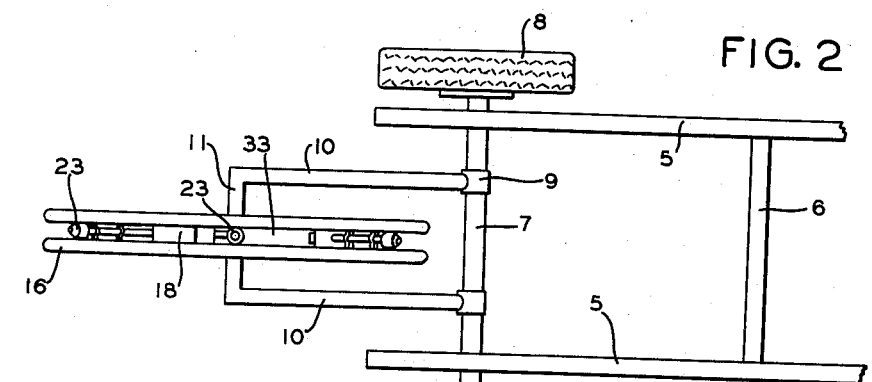
FIG. 2 is a plan view of the machine taken along the line 2—2 of FIG. 1.
Figure 3:
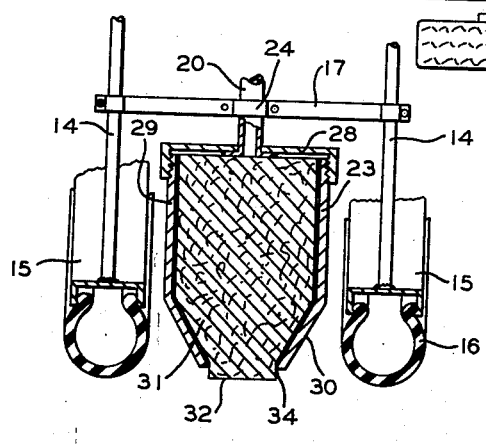
FIG. 3 is an enlarged fragmentary cross sectional end view taken along the line 3—3 of FIG. 1.

Referring now to the drawig in detail, the numeral 5 represents the spaced parallel beams of a trailer chassis having a transverse connecting beam 6, and a rear axle 7 rotatably mounting two road wheels 8.

Projecting radially from axle 7 and pivotally mounted thereon by spaced sleeves 9 are two tubular arms 10. An axle 11 connects the outwardly projecting ends of the tubular arms 10. A short sleeve 12 is rotatably mounted centrally of the axle 11 and supports two axially spaced wheel hub rings 13 at each end. Projecting radially and symmetrically from the periphery of each hub ring 13 are a number of spokes 14. The spokes terminate to concentrically support two peripheral wheel rims 15 adapted to mount pneumatic tires 16. The axially spaced and aligned spokes are suitably connected together by spacing bars 17 suitably located to combine the two wheels into a single rigid rotating wheel framework 33.

Intermediate the axially spaced spokes 14 are mounted three paint tanks 18 having suitable filling caps 19 are secured symmetrically with respect to the hub rings 13. Pipes 20 extend from each end of the paint tanks and are bent at 21 to extend radially in a parallel line between opposing spokes 14. A suitable valve cock 22 is connected with each pipe, and the pipe terminates with a painting head 23. Straps 24 secure the pipes to the centre of the spacing bars 17.

The painting heads 23 comprise a threaded cap 28 mounted centrally to the end of the pipe which is adapted to project therethrough. A circular container 29 is releasably threaded at one end into the cap and terminates downwardly with an inwardly tapering cone 30. Received inwardly of the container is a shaped block of paint absorbent fibrous material 31, which is adapted to project outwardly through the open end 34 of the tapering cone 30 to terminate with a circular pad 32 disposed in the same peripheral plane as the tires 16.

The dimensions of this machine are a matter of choice, but I prefer a wheel framework having a diameter in the order of twelve feet. I also propose twelve spokes to each side of the wheel such that alternate spokes support a pipe and terminating paint head. The shape of the paint pad has been disclosed, by way of example, as circular in cross section. The pad can be constructed with a curved rectangular ground engaging face if so desired, both the dimensions and shape depending on preference or laid down regulations.

The wheel structure is adapted for pivotal movement about the axle 7 and may be hydraulically operated if so desired. The inoperative position of the wheel is shown in broken lines in FIG. 1, and indicated generally by primed numerals 10', 14' and 16'. The operation of the machine will be quite apparent to the reader, the interval between markings being dependent on the peripheral spacing of the painting heads 23. Rotation of the wheel framework maintains the paint in a thoroughly mixed condition and ensures constant feed to the peripheral pads 32. The pads are removable for cleaning, storage and replacement purposes.

Having described the invention in a preferred form, it will be appreciated that some modifications may be made to the percise configuration, without departing from the scope or spirit of the invention, as defined by the following claims.

I claim:

1. A road line painting machine comprising, in combination, a wheel framework mounted for rotation upon the ground in a vertical plane between two projecting arms, said arms pivotally depending from a trailer, said wheel framework comprising axially spaced radially extending spokes terminating with two axially spaced peripheral rims, tires mounted upon said rims, paint containers mounted between the axially spaced spokes and secured thereto in a symmetrical manner inwardly of the peripheral rims for rotation therewith, pipes extending from said containers and terminating with painting heads mounted intermediate said rims, said painting heads containing a paint absorbent material having a pad extending outwardly of the head for engagement with the ground for rotation of said wheel framework, valves mounted upon said pipes intermediate said containers and each one of said painting heads controlling the flow of paint from said containers to each of said painting heads, whereby flow of paint to selected ones of said painting heads determines the spacing between successive imprints made upon the ground by said pads.

2. A road line painting machine according to claim 1 wherein said spaced spokes are connected together by spacing bars, and wherein said pipes are mounted on said bars.

References Cited in the file of this patent
UNITED STATES PATENTS

| | | |
|---|---|---|
| 537,923 | Hildyard | Apr. 23, 1895 |
| 1,559,067 | Brasseur | Oct. 27, 1925 |
| 1,707,149 | Stamper | Mar. 26, 1929 |
| 1,707,855 | Hart | Apr. 2, 1929 |
| 2,130,356 | Marshall | Sept. 20, 1938 |